United States Patent [19]

Zehren

[11] 4,009,756
[45] Mar. 1, 1977

[54] METHOD AND APPARATUS FOR FLOODING OF OIL-BEARING FORMATIONS BY DOWNWARD INTER-ZONE PUMPING

[75] Inventor: James N. Zehren, Bartlesville, Okla.

[73] Assignee: TRW, Incorporated, Cleveland, Ohio

[22] Filed: Sept. 24, 1975

[21] Appl. No.: 616,319

[52] U.S. Cl. .................................. 166/250; 166/68; 166/106; 166/321; 166/268; 166/305 R; 137/522; 137/529

[51] Int. Cl.² ................. E21B 43/00; E21B 43/20; F16K 17/06

[58] Field of Search ........... 166/268, 305 R, 305 D, 166/224 R, 250, 64, 65, 101, 105, 106, 115, 65; 137/522, 529; 251/1

[56] References Cited

UNITED STATES PATENTS

| | | | |
|---|---|---|---|
| 2,352,834 | 7/1944 | Hassler | 166/269 X |
| 2,375,810 | 5/1945 | Nelson | 137/522 X |
| 2,742,054 | 4/1956 | Poundstone | 137/522 |
| 2,771,091 | 11/1956 | Baker et al. | 166/224 R X |
| 2,808,111 | 10/1967 | Krueger | 166/306 X |
| 3,084,898 | 4/1963 | Miller | 166/224 R X |
| 3,428,071 | 2/1969 | Kobnick | 137/522 X |
| 3,435,844 | 4/1969 | Stelzer | 137/522 |
| 3,454,085 | 7/1969 | Bostock | 166/306 X |
| 3,631,887 | 1/1972 | Fellbach et al. | 137/522 |

Primary Examiner—Stephen J. Novosad
Attorney, Agent, or Firm—Shapiro and Shapiro

[57] ABSTRACT

Sub-surface water is pumped through a bore hole to an oil-bearing formation by a pump installation in the bore hole including a submergible pump and an adjustable control valve at the discharge side of the pump. The control valve closes automatically when the pump is not operating to prevent reverse flow and loss of flooding pressure and to insure a back pressure on the pump during starting, and is controlled hydraulically from the surface of the earth to vary the flow to the oil-bearing formation. A novel control valve structure provides accurate and reliable control without unduly restricting the flow volume.

21 Claims, 2 Drawing Figures

METHOD AND APPARATUS FOR FLOODING OF OIL-BEARING FORMATIONS BY DOWNWARD INTER-ZONE PUMPING

BACKGROUND OF THE INVENTION

This invention is concerned with flooding of underground formations, such as oil-bearing strata and the like, and is more particularly concerned with an improved pump installation for pumping sub-surface water to an oil-bearing formation, and with improved control valve apparatus.

In the secondary recovery of fluid hydrocarbons, such as oil, it is common practice to flood the hydrocarbon-bearing formation with water pumped through a bore hole, thereby applying fluid pressure which increases the yield of the desired hydrocarbon from its underground formation. Both surface water and sub-surface water have been employed for this purpose. In the employment of sub-surface water, two schemes have been utilized — (1) pumping the water upwardly to the surface through a first bore hole, then downwardly to the hydrocarbon-bearing formation through a second bore hole, and (2) pumping the water through a single bore hole communicating with both the water-bearing zone and the hydrocarbon-bearing zone. As will appear more fully hereinafter, the present invention is principally concerned with the second technique.

The following patents are typical of the prior art dealing with flooding oil-bearing strata and the like: Krueger; U.S. Pat. No. 2,808,111 Van Den Beemt; U.S. Pat. No. 2,706,526 Gray et al; U.S. Pat. No. 2,551,434 Heath; U.S. Pat. No. 2,347,779 Arutunoff; U.S. Pat. No. 3,170,520 Engle; U.S. Pat. No. 3,354,952 Hassler; U.S. Pat. No. 2,352,834 Chenoweth; U.S. Pat. No. 3,455,382.

Krueger, Van Den Beemt, and Gray et al pump water downwardly through a bore hole and through a packer to flood an oil-bearing zone communicating with the bore hole at a lower level. Heath employs a similar technique, but in which the water pressure is high enough to avoid the need for a pump. The flow rate is regulated by a mechanically adjusted valve. Arutunoff and Engle pump upwardly through a bore hole for flooding. Hassler and Chenoweth are broadly concerned with regulation of the flow of the flooding medium.

As will appear more fully hereinafter, underlying the present invention is the discovery of the need for a critical type of flow control, by means of a special flow control valve in conjunction with a submergible pump. Valves of various types in wells and/or in conjunction with pumps have of course been known for many years. See, for example, the following prior patents: O'Rourke, U.S. Pat. No. 3,807,894; Miller, U.S. Pat. No. 3,084,898; Page, U.S. Pat. No. 3,477,507; Baker, U.S. Pat. No. 1,631,509; Garrett, U.S. Pat. No. 3,698,411; Litchfield et al, U.S. Pat. No. 3,698,426; Vincent, U.S. Pat. No. 3,294,174; Pistole et al, U.S. Pat. No. 3,007,524; Bows, U.S. Pat. No. 3,747,618; Verheul, U.S. Pat. No. 3,640,303; Reaves, U.S. Pat. No. 3,610,569; Kruse et al, U.S. Pat. No. 1,829,704; Natho, U.S. Pat. Re. No. 25,109; and Canadian Pat. No. 749,740. However, the prior art is devoid of a teaching of the type of pump discharge flow control in flooding or the type of flow control valve required by the invention.

SUMMARY OF THE INVENTION

It is accordingly a principal object of the invention to provide improved secondary recovery apparatus and methods, improved apparatus and methods for flooding, improved pump installations, and improved control valves.

Briefly stated, in a preferred embodiment of the invention sub-surface water is pumped downwardly through a bore hole to an oil-bearing formation by a pump installation in the bore hole including a submergible pump and an adjustable control valve at the discharge side of the pump. The control valve closes automatically when the pump is not operating and is controlled hydraulically from the surface of the earth to vary the flow to the oil-bearing formation.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
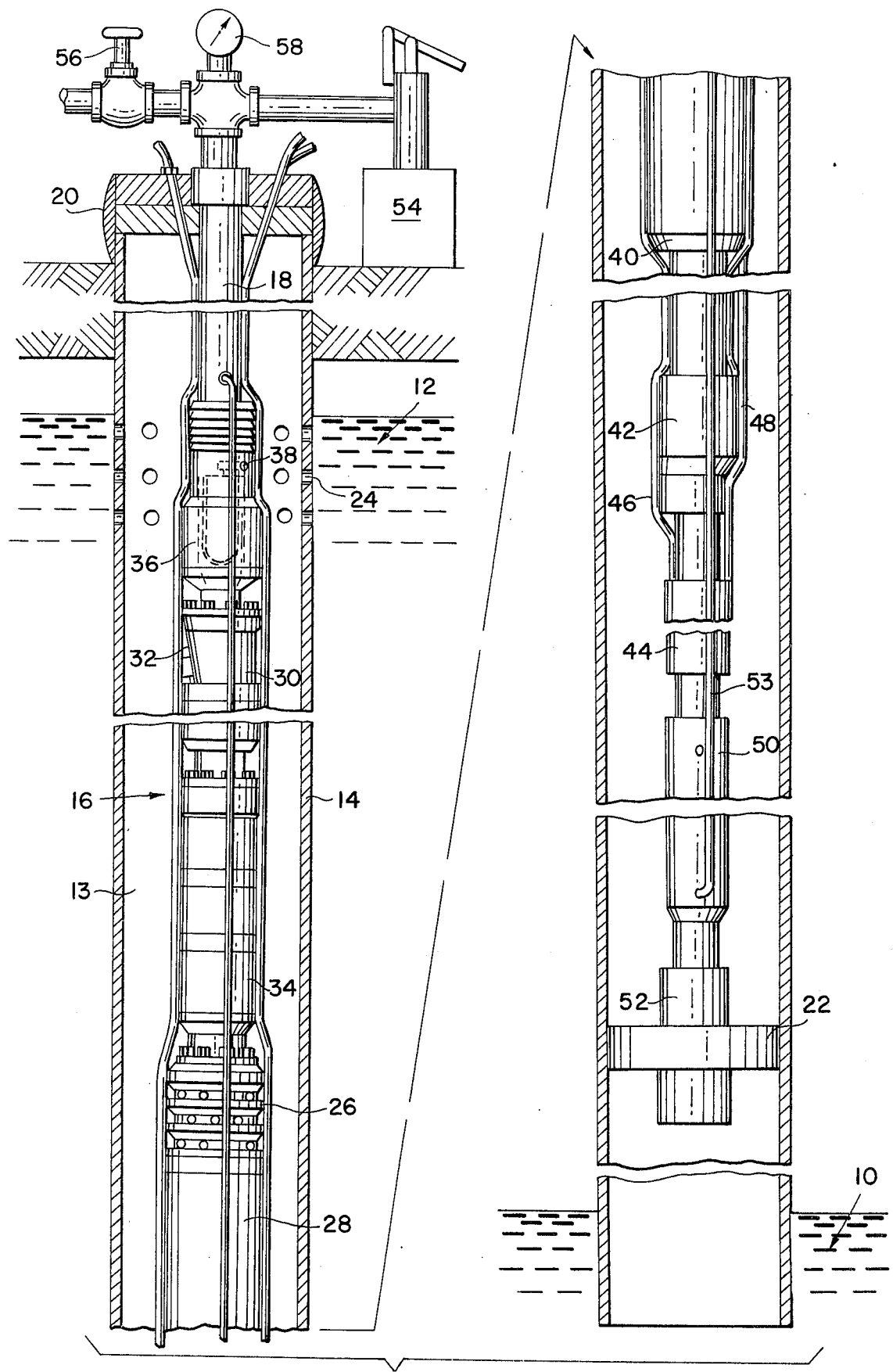
FIG. 1 is a truncated vertical sectional view illustrating a flooding installation in accordance with the invention.

Referring to FIG. 1 of the drawings, in accordance with the illustrated application of the invention it is desired to flood an oil-bearing zone 10 with sub-surface water pumped from a water-bearing zone 12, which, in the example shown, is at a higher sub-surface level than the oil-bearing zone. Both zones communicate with a bore hole 13, which in the example shown, contains a casing 14.

To pump water from zone 12 to zone 10, a pump installation 16 is provided. As shown, the pump installation 16 may be suspended by tubing 18 from the well head 20 at the surface of the earth, successive colinear housing sections of the installation being bolted together. The down-hole end of the installation engages and traverses a conventional packer 22, which divides the casing 14 into an upper zone above the packer and a lower zone below the packer.

Water from the water-bearing zone at 12 enters casing 14 via perforations 24 and flows downwardly to the intake head 26 of a submergible pump 28, which may be of the centrifugal type having a tubular housing containing diffusers and a shaft carrying impellers. The pump is driven by an electric motor 30 energized by power supplied from the surface via cable 32. The electric motor is preferably of the oil-filled type, and the drive shaft of the motor extends through a combined protector and thrust section 34 to engage the impeller shaft of the pump 28. The thrust section 34 is also filled with oil in the manner of the protector described in Arutunoff U.S. Pat. No. 2,783,400, for example, and preferably contains a plurality of thrust bearings to accommodate both upward and downward thrust of the drive shaft. At its upper end the motor 30 may be provided with an expansion chamber 36 containing a flexible bag, one side of which is exposed to the ambient pressure in the bore hole via a vent 38, the other side of which is exposed to the oil pressure in the motor 30. By this arrangement the thrust section 34 may be kept completely isolated from the fluid in the bore hole and need not include the check valves that are conventionally employed in protectors.

The discharge end 40 of the submergible pump is coupled to a flow meter 42, such as the turbine type manufactured by the Halliburton Company, the flow meter being coupled in turn to pressure sensors 44, such as the type employed in the Lynes Sentry Systems manufactured by Baker Division of Baker Oil Tools Inc. The pressure sensors may measure the discharge pressure of the pump as well as the ambient bore hole pressure, if desired. Electrical output signals from the pressure sensors 44 and the flow meter 42 are transmitted to indicators (not shown) at the surface of the earth via cables 46 and 48.

Coupled in turn to the pressure sensors 44 is a flow control valve 50 in accordance with the invention. The discharge pipe 52 of the flow control valve extends through packer 22. As will be seen hereinafter, operation of the flow control valve requires a hydraulic fluid connection to the surface, and in the form shown this connection is provided by a conduit 53 connecting the flow control valve 50 to the tubing 18, by which the pump installation may be suspended. Tubing 18 and conduit 53 may be pressurized with hydraulic fluid supplied from the surface by a hand pump 54, and the pressure may be relieved by a valve indicated diagrammatically at 56. An indicator 58 shows the pressure in tubing 18.

Figure 2:
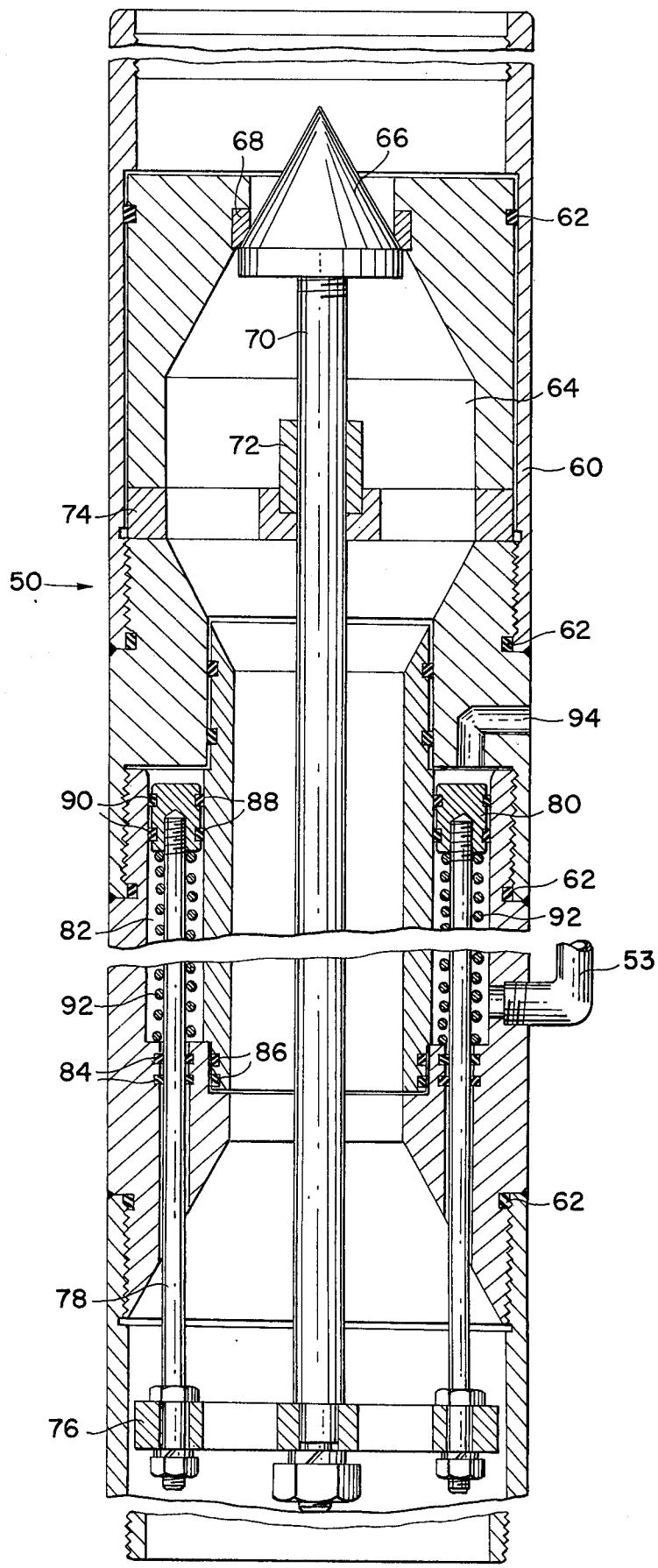
FIG. 2 is a truncated vertical sectional view illustrating the preferred control valve of the invention.

FIG. 2 illustrates the structure of the control valve. The valve comprises a cylindrical housing 60, which in the form shown is constituted by several consecutive parts threaded together and provided with suitable O-rings 62 to prevent leakage. The housing contains a large-diameter longitudinal passageway 64, one end of which (the upper end in the form shown) is adapted to be closed by engagement of the head or plug 66 of a valve member with a seat 68. The valve head is preferably tapered and engages a seat of complementary taper, thereby isolating a first space above the valve head from a second space below the valve head. The valve head is supported at one end of a stem or shaft 70, which reciprocates in a bearing 72 supported by the center portion of an apertured disk or spider 74. The lower end of the valve stem carries a further apertured disk or spider 76 connected to one end of a plurality of circumferentially spaced rods 78 (only two of which are shown). At their opposite end the rods are connected to an annular piston 80 which reciprocates in an annular cylinder or chamber 82 formed in the wall of the valve housing and isolated from the main passage 64 of the valve by means of seals 84 and 86. Piston 80 may be provided with internal piston rings 88 and external piston rings 90. Coil compression springs 92 surrounding the rods 78 urge the piston 80 upwardly in the chamber 82 and hence tend to close the valve head 66 against the seat 68. The upper end of chamber 82 is vented to the exterior of the housing of the valve (to the ambient pressure in the bore hole) by means of a vent 94, while the lower end of chamber 82 is connected to conduit 53 for the supply of hydraulic fluid thereto from the surface, so that a pressure differential can be provided across the piston and so that an adjustable force can be selectively applied to the valve member.

When the pump is not operating, springs 92 have sufficient force to close the control valve 50. When it is desired to pump water from zone 12 to an oil-bearing zone 10 for flooding, the pump is energized with the valve closed, sufficient hydraulic pressure having been built up in the conduit 53 to maintain the valve closed even when the pump is started. This insures that the pump will start against adequate back pressure to prevent runaway and damage to the pump. As the pump discharge pressure builds up, indicated by the pressure sensors 44, the operator at the surface relieves the pressure in conduit 53, so that the pump discharge pressure gradually forces the valve head 66 away from the seat 68 against the force of springs 92. Water discharged from the pump then begins to flow through passage 64 of the valve, the flow being indicated by the output of the flow meter 42. The operator relieves the pressure in conduit 53 enough to provide the desired pressure and flow conditions for flooding. With the large diameter passage 64 through the valve, flow is minimally restricted by the valve per se when it is desired to provide maximum flow to the oil-bearing zone 10. The ambient pressure in the bore may vary considerably, particularly as the head of water drops, and the hydraulic pressure in conduit 53 can be reduced further to compensate for lower ambient pressures.

When the pump is de-energized, springs 92 will close the valve 50 automatically, since the discharge pressure on the valve head 66 will no longer tend to open the valve. Springs 92 may have sufficient force to maintain the valve closed against any column or water above the valve. Even if a substantial ambient pressure develops above the packer when the pump is not operating, the valve will remain closed if sufficient pressure is maintained in conduit 53, the ambient pressure being insufficient to overcome the combined force of the springs 92, the pressure in conduit 53, and the pressure exerted upon the underside of valve head 66. The valve configuration prevents reverse flow (upwardly) through the bore once the valve is closed, insuring against loss of flooding pressure, flow of oil through the flooding bore, and windmilling of the pump (free reverse rotation) which would prevent safe starting of the pump in the required rotational direction.

While a preferred embodiment of the invention has been shown and described, it will be apparent to those skilled in the art that changes can be made in this embodiment without departing from the principles and spirit of the invention, the scope of which is defined in the appended claims.

The invention claimed is:

1. Apparatus for flooding an underground formation with fluid through a bore hole, said apparatus comprising a submergible pump including a tubular pump housing with a fluid intake adjacent to one end thereof for receiving flooding fluid and including means within said housing for moving fluid from said intake to a fluid discharge adjacent to the opposite end of said housing; and flow control valve means including a tubular valve housing coupled to said opposite end of the pump housing for receiving fluid from said discharge, a valve member supported in said valve housing for movement to and from a closed position, said valve member in said closed position isolating a first space at one side of said valve member, which receives fluid discharged by the pump, from a second space at another side of said valve member, biasing means for normally urging said valve member toward said closed position and control means for selectively applying an adjustable force to said valve member to assist said biasing means in urging said valve member toward said closed position or to permit said valve member to move away from said closed position to a controlled extent, whereby said valve member can be kept closed during start-up of said pump and can thereafter be moved away from said closed position.

2. Apparatus in accordance with claim 1, wherein said pump is a centrifugal pump.

3. Apparatus in accordance with claim 1, wherein said pump and said control valve means are part of an installation including said pump, a flow meter, pressure sensor means, and said control valve means in series.

4. Apparatus in accordance with claim 1, wherein fluid is pumped downwardly, is discharged from said control valve means through a packer in said bore hole, and is supplied to said pump intake from an underground formation communicating with said bore hole at a level above the level of the first-mentioned formation.

5. Apparatus for flooding an underground formation with fluid through a bore hole, said apparatus comprising a submergible pump including a tubular pump housing with a fluid intake adjacent to one end thereof for receiving flooding fluid and including means within said housing for moving fluid from said intake to a fluid discharge adjacent to the opposite end of said housing; and flow control valve means including a tubular valve housing coupled to said opposite end of the pump housing for receiving fluid from said discharge, a valve member supported in said valve housing for movement to and from a closed position, said valve member in said closed position isolating a first space at one side of said valve member, which receives fluid discharged by the pump, from a second space at another side of said valve member, biasing means for normally urging said valve member toward said closed position and control means for selectively applying an adjustable force to said valve member to permit said valve member to move away from said closed position to a controlled extent, said control means comprising a piston coupled to said valve member and supported for movement in a chamber in said valve housing and means for applying a differential fluid pressure across said piston.

6. Apparatus in accordance with claim 5, wherein the last-mentioned means comprises a vent in said chamber at one side of said piston and means for applying a controlled fluid pressure to said chamber at the opposite side of said piston.

7. Apparatus in accordance with claim 6, wherein the last-mentioned means comprises a conduit for connecting said chamber at said opposite side of said piston to a source of variable fluid pressure at the surface of the earth.

8. Apparatus in accordance with claim 7, wherein said chamber is an annular chamber in a wall of said valve housing, wherein said piston is an annular piston, and wherein said biasing means comprises a spring in said chamber.

9. Apparatus in accordance with claim 8, wherein said valve member has an operating rod extending along the axis of said valve housing with a valve head moving toward said pump discharge to close against a seat in said valve housing, and wherein said piston has a plurality of piston rods extending along the length of said valve housing and coupled to the operating rod of said valve member.

10. Apparatus in accordance with claim 7, wherein fluid discharged by said pump urges such valve member away from said closed position in opposition to said biasing means, wherein said source of variable pressure comprises means for applying sufficient pressure at said opposite side of said piston to prevent movement of said valve member away from said closed position when said pump starts, and means for reducing that pressure to permit such movements of said valve member and for varying that pressure to compensate for reduction of the ambient fluid pressure as the pump operates.

11. Apparatus in accordance with claim 10, wherein said biasing means has sufficient force to move said valve member to said closed position when said pump ceases operation.

12. Apparatus in accordance with claim 7, wherein said conduit comprises tubing means for supporting said pump and said control valve means in said bore hole.

13. Apparatus in accordance with claim 6, wherein said vent is connected to ambient fluid in said bore hole.

14. A flow control valve system comprising a tubular housing having a longitudinal fluid flow passage therein, means including a valve head movable with respect to a seat for dividing said passage into isolated first and second spaces when said head is closed against said seat, means coupling said first space to a source of fluid the pressure of which tends to move said head away from said seat to open said valve when said valve is closed, biasing means normally urging said head against said seat to close said valve, and fluid-pressure-responsive remote control means for selectively applying an adjustable additional force to said valve head to assist said biasing means to close said valve or, upon reduction of said force, to permit said head to move away from said seat in response to the pressure of fluid from said source, whereby said fluid may flow from said first space to said second space.

15. A flow control valve comprising a tubular housing having a longitudinal fluid flow passage therein, means including a valve head movable with respect to a seat for dividing said passage into isolated first and second spaces when said head is closed against said seat, means for coupling said first space to a source of fluid which tends to move said head away from said seat to open said valve, biasing means for normally urging said head against said seat to close said valve, and control means for selectively applying an adjustable force to said valve head to permit said head to move away from said seat, whereby said fluid may flow from said first space to said second space, said valve head being supported upon an operating stem which reciprocates along said passage and said control means comprising a piston movable in a chamber and connected to said stem and means for applying a differential fluid pressure across said piston in said chamber.

16. A flow control valve in accordance with claim 15, wherein said chamber and said piston are annular and are located in a wall of said housing surrounding said passage.

17. A flow control valve in accordance with claim 16, wherein said piston is connected to said stem by piston rods, and wherein said biasing means comprises spring means in said chamber.

18. A flow control valve in accordance with claim 15, wherein said stem is positioned centrally in said passage and is spaced from the walls of said passage for the free flow of fluid between the stem and said passage walls and wherein said chamber and said piston are located in a wall of said housing.

19. A method of flooding an underground formation with a fluid through a bore hole, which comprises dividing said bore hole into first and second regions, the latter communicating with said formation, providing a submergible pump at said first region which discharges through a valve to said second region, supplying fluid from said first region to said pump, operating said pump, initially blocking the discharge of fluid from said pump to said second region during start-up of said pump by applying a force to said valve to hold it closed, thereafter reducing said force and opening said valve, thereby permitting fluid to flow from said pump to said second region, adjustably controlling said valve independently of the pump to maintain flooding of said formation, terminating the operation of said pump, and thereupon automatically closing said valve, thereby blocking reverse flow from said second region to said pump.

20. A method of flooding an underground formation with a fluid through a bore hole, which comprises dividing said bore hole into first and second regions, the latter communicating with said formation, providing a submergible pump at said first region, supplying fluid from said first region to said pump, operating said pump, initially blocking the discharge of fluid from said pump to said second region, thereafter permitting fluid to flow from said pump to said second region, controlling said flow after discharge from said pump to maintain flooding of said formation, terminating the operation of said pump, and thereupon automatically blocking reverse flow from said second region to said pump, said flow blocking, permitting and controlling being effected by providing a valve at the discharge of said pump, normally biasing said valve closed and fluidically controlling said valve from the surface of the earth to open said valve only after the pump commences operation and to vary the flow through said valve to compensate for ambient pressure variations in said bore hole.

21. A method in accordance with claim 20, further comprising monitoring at the earth's surface the flow volume and discharge pressure from said pump for control of said valve.

* * * * *